United States Patent [19]

Farrington, Jr. et al.

[11] 3,829,541

[45] Aug. 13, 1974

[54] DIRECT BONDED REFRACTORY BRICKS

[75] Inventors: Grant M. Farrington, Jr., Marlton, N.J.; Walter S. Treffner, Linthicum Heights, Md.

[73] Assignee: General Refractories Company, Philadelphia, Pa.

[22] Filed: Apr. 19, 1972

[21] Appl. No.: 245,637

Related U.S. Application Data

[63] Continuation-in-part of Ser. No. 825,046, May 15, 1969, abandoned.

[52] U.S. Cl. .......................... 264/65, 264/56, 264/66
[51] Int. Cl. ............................................... F27b 9/10
[58] Field of Search ............ 264/65; 106/59, 64, 66

[56] References Cited
UNITED STATES PATENTS

| | | | |
|---|---|---|---|
| 3,180,743 | 4/1965 | Davies et al. | 106/59 |
| 3,180,745 | 4/1965 | Davies | 106/59 |
| 3,321,322 | 5/1967 | Mikami | 106/59 |
| 3,429,723 | 2/1969 | Maier et al. | 106/59 |

FOREIGN PATENTS OR APPLICATIONS

| | | | |
|---|---|---|---|
| 637,794 | 5/1950 | Great Britain | 264/65 |

OTHER PUBLICATIONS

G. H. B. Lovell, "The Firing Expansions of Certain Chrome–Magnesite Products," Transactions of the British Ceramic Society, 1952, pp. 369–383.

*Primary Examiner*—Donald J. Arnold
*Attorney, Agent, or Firm*—Finnegan, Henderson, Farabow & Garrett

[57] ABSTRACT

Disclosed herein is a process for the preparation of direct bonded refractory bricks. This process comprises firing a pressed refractory composition of magnesite and chrome ore while maintaining the iron oxides ordinarily present in the chrome ore in their divalent state during the heating stage.

11 Claims, No Drawings

DIRECT BONDED REFRACTORY BRICKS

This application is a continuation-in-part application of Ser. No. 825,046, filed May 15, 1969, and now abandoned.

This invention relates to an improved process for the preparation of direct bonded refractory bricks and shapes. More specifically, this invention relates to a process which comprises firing direct bonded refractory bricks in a manner whereby the iron in the chrome ore is maintained in the divalent state.

Direct bonded refractory bricks or shapes are prepared from refractory compositions comprising predominantly chrome ore and magnesite. The chrome ore consists essentially of the chromite spinel with minor accessory silicate gangue minerals. The magnesite, which is often referred to as pericease, consists of magnesia, that is, magnesium oxide with minor amounts of silicates and other impurities.

Specifically, refractory chrome ores like most other ores are obtained from natural deposits. Refractory chrome ore consists of a solid solution of minerals containing $Cr_2O_3$, $MgO$, $Al_2O_3$ and iron oxides with a siliceous mineral gangue. On an oxide basis, refractory chrome ore usually analyzes from about 2 to 9 percent of $SiO_2$. Often chrome ores are classified by their iron oxide content, that is, they will be considered as being either "high iron" or "low iron" content ores. The term "high iron" ordinarily refers to those ores containing in the range of about 20 to 30 percent by weight FeO and generally about 25 percent FeO. Those chrome ores containing less than 20 percent FeO are referred to as "low iron" ores. Generally, the low iron ores will contain about 15 percent FeO.

Refractory magnesia is made by "dead burning" the mineral magnesite ($MgCO_3$), or such magnesium compounds as the hydrate or the chloride, to obtain a residual dense grain of magnesium oxide of stable character. In essence, the term "dead burning" denotes the stable character of the magnesium oxide grain which results.

In recent years, materials of greater purity have become available. For example, by beneficiation, chrome ores with a silica content as low as 1 to 2 percent can be obtained. An equally important change has occurred in commercially available refractory magnesite which now commonly analyzes 97 to 99+ percent MgO. In these relatively pure refractory magnesites, the silica usually constitutes less than 1 percent by weight of the ore.

In conventional magnesia-chrome and/or chrome-magnesia refractories, the magnesia phase is bonded to the chromite phase by silicates developed by reaction of the magnesia with the gangue silicates of the chrome ore to orthosilicates such as merwinite, forsterite and monticellite. The bonding structure is essentially a bridgework of silicate connecting and joining the predominant magnesia and chromite spinel phases. In direct bonded refractories the periclase and chromite spinel phases are, as the name implies, directly joined together without intervention of a silicate phase. The present invention is, as noted heretofore, concerned with direct bonded refractory shapes prepared from low silicate ores.

In the manufacture of direct bonded refractory bricks and shapes, chrome ore and periclase of optimum grain sizing are mixed along with appropriate temporary binders in predetermined proportionate quantities. Such binder compositions will usually consist of small amounts of water and a binder material or materials. Some typical binder materials would include lignosulfonates, pitch, magnesium, salts, chromic and sulfuric acids, and the like.

The mixture of chrome ore, periclase and binder is blended and pressed in a mold under a pressure in excess of 5,000 p.s.i. and preferably about 15,000 to 20,000 p.s.i. This pressed or molded shape is then dried in a suitable manner, such as for example, in an oven effective therefor and having a temperature in the range of about 90° to 180°C. and preferably about 100° to 125°C. The most effective pressure and temperature combination for any particular ore blend is, of course, readily determinable by one skilled in the art. After mixing, pressing and drying, the refractory shapes are fired in a kiln at maturing temperatures usually in excess of at least about 1650°C. Generally and preferably, such firing will be conducted at a maturing temperature in the range of about 1700° to 1900°C.

As stated hereinbefore, the chrome ores combined with the periclase contain substantial amounts of iron oxide in the divalent state, namely, FeO. In the prior art methods of preparing direct bonded bricks, kilns were fired at or near the most economical conditions, that is, at a fuel to air ratio less than 1:1. This resulted in the iron oxide being oxidized to the trivalent state, namely, $Fe_2O_3$ while the brick is being heated to the peak firing or maturing temperature. It has now been discovered that by minimizing the oxidation of the FeO in the brick during firing, that is, during the heating stage of firing, one obtains refractory bricks having significantly improved physical properties and characteristics. More specifically, the process of this invention comprises firing a pressed refractory composition consisting essentially of magnesite and chrome ore in a combination suitable for forming a direct bonded refractory shape, said firing to be conducted in such a manner that during the heating stage thereof, essentially all of the iron oxide in the chrome ore is maintained in its divalent state. It is, of course, known that the FeO in chrome ore will be oxidized to the trivalent state, namely, $Fe_2O_3$, at temperatures as low as 320°C. However, in most commercial operations significant oxidation of the iron will not take place below 800°C. Thus, maintenance of the iron in the divalent state during the heating stage pursuant to this invention is of concern when the temperature is in the range of about 800° to 1650°C. and is of particular importance at the upper half of this temperature range, that is, 1300° to 1650°C. At temperatures in excess of about 1500°C. the $Fe_2O_3$ is believed to be unstable and so the FeO should not be oxidized to the trivalent state. Despite this apparent instability at temperatures above 1500°C. presently preferred results are obtained when the bricks are maintained under nonoxidizing conditions during heating up to at least 1650°C.

During the cooling stage, no control need be exercised with respect to the oxidation of the iron oxide. Actually, other than the procedures employed during the heating stage as stated herein, the process is essentially the same as those of the prior art. Refractory bricks prepared in accordance with this invention will exhibit increased stability during firing, higher fired density, reduced porosity and greater high temperature strength. It should be noted that the term "firing" as employed herein shall embrace all three stages of the total cycle, namely, "heating," "holding," and "cooling." By "heating stage" is meant that portion of the firing cycle wherein the temperature of the pressed refractory composition is elevated from room temperature to the desired maturing temperature. The "holding stage" is that portion of the firing cycle wherein the maturing temperature is maintained for a predetermined amount of time. And, of course, the "cooling stage" comprises lowering the temperature of the brick from maturing temperature to room temperature or thereabout.

Maintaining the iron oxide in its divalent state during firing is accomplished by controlling the oxygen content of the atmosphere surrounding the refractory composition. Specifically, during the heating stage, that is, while raising the temperature of the refractory composition to about 1650°C., the atmosphere surrounding the refractory should be non-oxidizing which is achieved by maintaining a fuel to air ratio of at least 1:1, and should not comprise more than about 2 percent by volume of oxygen as measured by Orsat analysis. Actually, it is preferable to maintain the oxygen content of the atmosphere at even lower levels, namely, below about 0.5 percent by volume and a fuel to air ratio greater than 1:1.

Means for maintaining a non-oxidizing atmosphere during the heating stage, and specifically for controlling the oxygen content of the atmosphere within the scope of this invention are known to those skilled in the art. For example, oxy-gas or raw gas burners may be utilized in the kiln. The use of either will render it possible to maintain the desired non-oxidizing atmosphere and oxygen level during firing.

In actual practice in a continuous tunnel kiln, excess fuel can be injected into the preheat zone to provide the desired non-oxidizing atmosphere. This excess fuel combines with the excess oxygen normally present in the preheat zone due to the need to provide heat transfer to the refractory materials by convection through inducing a draft in the kiln. This induced draft normally results in high excess oxygen levels in the preheat zone of the kiln. The injection of excess fuel lowers the oxygen content to the desired level, and the presence of combustibles in the combustion gases assures a non-oxidizing atomsphere even when a small amount of oxygen is present in the flue gas.

As would be expected, the chrome-magnesite ratio in any refractory composition may vary widely. Generally, a refractory composition suitable for forming a direct bonded refractory shape will comprise by weight in the range of about 40 to 80 percent magnesite and about 20 to 60 percent chrome ore. Preferably, such a composition will comprise in the range of about 50 to 70 percent magnesite and about 30 to 50 percent chrome ore.

Both the magnesite and chrome ore should be relatively pure with respect to silicate content. Specifically, the silicates in either the magnesite or chrome ores should constitute less than 5 percent by weight of the ore and preferably less than 2 percent.

As noted heretofore, chrome ores are either high or low in iron content. This invention may be utilized with either type. However, significantly greater improvements in physical properties have been observed in refractory bricks prepared from chrome ore which is high in iron content.

The many facets of this invention are further illustrated by the following examples which are not to be construed as limitations thereof. On the contrary, resort may be had to various other embodiments, modifications and equivalents of these examples which readily suggest themselves to those skilled in the art without departing from the spirit of the present invention and/or the scope of the appended claims.

EXAMPLE 1

A brick composition comprising 60 percent high purity magnesite (35 percent magnesite coarses and 25 percent magnesite fines) and 40 percent chrome ore was blended and compressed into bricks under 15,000 p.s.i.

The chrome ore and magnesite employed had the following analysis:

| Chrome Ore | |
|---|---|
| $SiO_2$ | 0.9% |
| $Al_2O_3$ | 15.3% |
| FeO | 24.9% |
| CaO | 0.3% |
| MgO | 10.3% |
| $Cr_2O_3$ | 46.7% |

| Magnesite | |
|---|---|
| $SiO_2$ | 0.5% |
| CaO | 0.7% |
| $Fe_2O_3$ | 0.2% |
| $Al_2O_3$ | 0.2% |
| MgO | 98.4% |

After pressing, the bricks were divided into two groups. One such group was fired in a laboratory furnace at a maturing temperature of 1700°C. for five hours under normal firing conditions. Specifically, the furnace was operated to achieve the optimum and most economical firing conditions. The oxygen content of the atmosphere was measured in the temperature range between 800° and 1650°C. and such varied between 3.0 and 5.6 percent by volume. During this portion of the firing, the fuel to air ratio was less than 1:1.

The second group of bricks was also fired in a laboratory furnace at 1700°C. for five hours, but during the heating stage, that is, from 800° to 1650°C., the oxygen content of the atmosphere was maintained at a maximum of 0.5 percent by volume and the fuel to air ratio was greater than 1:1. Upon completion of the firing and after cooling of the bricks to room temperature they were examined for density, expansion, porosity, and strength. The results thereof are set forth below.

| | | GROUP I | GROUP II |
|---|---|---|---|
| | | Oxygen Content — 3.0 to 5.6% — Fuel to Air Ratio Less Than 1:1 | Oxygen Content — 0.5% — Fuel to Air Ratio Greater Than 1:1 |
| Unfired Density | (g/cc) | 3.22 | 3.23 |
| Fired Density | (g/cc) | 3.09 | 3.20 |
| Firing Expansion | (%) | 0.73 | 0.33 |
| Open Porosity | (%) | 18.00 | 16.60 |

|  | GROUP I | GROUP II |
| --- | --- | --- |
|  | Oxygen Content — 3.0 to 5.6% — Fuel to Air Ratio Less Than 1:1 | Oxygen Content — 0.5% — Fuel to Air Ratio Greater Than 1:1 |
| Hot Modulus of Rupture (p.s.i.) | | |
| at 2300°F. | 1530 | 2115 |
| at 2700°F. | 150 | 335 |

As is evident, the Group II bricks prepared in accordance with the process of this invention exhibit less than half the expansion of the Group I bricks. In addition, the Group II bricks exhibit reduced porosity and higher modulus of rupture--all of which are highly desirable characteristics. In fact, as indicated above, the hot modulus of rupture at 2700°F. for the Group II bricks is 335 which is more than twice as high as that achieved for the Group I bricks.

EXAMPLE 2

Two groups of bricks were prepared in a manner similar to that employed in Example 1. In this preparation the brick composition comprised 30 percent chrome ore and 70 percent magnesite. The raw materials were the same as those utilized in Example 1.

After firing the bricks were evaluated. The results thereof are set forth below.

|  |  | GROUP I | GROUP II |
| --- | --- | --- | --- |
|  |  | Oxygen Content — 3.0 to 5.6% — Fuel to Air Ratio Less Than 1:1 | Oxygen Content — 0.5% — Fuel to Air Ratio Greater Than 1:1 |
| Unfired Density | (g/cc) | 3.08 | 3.08 |
| Fired Density | (g/cc) | 2.99 | 3.03 |
| Firing Expansion | (%) | 1.40 | 0.47 |
| Open Porosity | (%) | 19.50 | 16.50 |
| Hot Modulus of Rupture (p.s.i.) | | | |
| at 2300°F. | | 1400 | 2460 |
| at 2700°F. | | — | 345 |

As indicated above, the bricks produced in accordance with the present invention (Group II) exhibit physical characteristics which are clearly superior to those prepared by the prior art method (Group I).

The bricks prepared in accordance with this invention are readily utilized in many typical refractory applications. However, they are particularly satisfactory for open hearth construction and especially the roof portions thereof.

EXAMPLE 3

Two groups of high purity magnesite-chrome bricks were prepared in a manner similar to that employed in Examples 1 and 2. However, a low iron type chrome ore was utilized rather than the high iron type employed in Examples 1 and 2. A typical chemical analysis of this low iron chrome ore is as follows:

| $SiO_2$ | 2.5% |
| --- | --- |
| $Al_2O_3$ | 29.8% |
| FeO | 14.1% |
| CaO | 0.2% |
| MgO | 16.6% |
| $Cr_2O_3$ | 36.8% |

The respective groups of brick were fired to above 1650°C. in separate commercial tunnel kilns while maintaining the atmosphere within the respective kilns at a non-oxidizing level by injecting excess natural gas into the preheat zone of the kilns.

The atmosphere within the kilns was studied using a Fisher Orsat Gas Analyser. The gas samples are taken through holes in the side wall of each kiln, about 15 inches above the center line of the burner ports. Tables I and II show the gas analysis at various points along the kilns.

TABLE I

TUNNEL KILN ATMOSPHERE STUDY FOR GROUP I BRICKS

| PROBE POSITION | T °F. | T °C. | % $CO_2$* | % $O_2$* | % CO* |
| --- | --- | --- | --- | --- | --- |
| 1 | 1210 | 654 | N.R. | N.R. | N.R. |
| 2 | 1810 | 988 | 6.2 | 11.4 | N.R. |
| 3 | 2300 | 1260 | 7.7 | 7.0 | 0.06 |
| 4 | 2455 | 1346 | 9.8 | 0.9 | 0.2 |
| 5 | 2580 | 1416 | 10.6 | 0.2 | 1.0 |
| 6 | 2735 | 1502 | 9.6 | 0.05 | 1.4 |
| 7 | 2820 | 1549 | 8.9 | 0.4 | 1.9 |
| 8 | 2940 | 1616 | 9.6 | 1.2 | 1.3 |
| 9 | 3130 | 1720 | 10.0 | 3.1 | 0.0 |
| 10 | 3130 | 1720 | 8.3 | 5.9 | 0.0 |
| 11 | 3150 | 1735 | 7.0 | 8.0 | 0.0 |
| 12 | 3190 | 1755 | 4.5 | 12.9 | 0.0 |
| 13 | 3205 | 1765 | 0.7 | 19.0 | 0.0 |
| 14 | 2975 | 1635 | 0.0 | 20.4 | 0.0 |
| 15 | 2685 | 1473 | 0.1 | 20.5 | 0.0 |
| 16 | 2490 | 1366 | 0.0 | 21.2 | 0.0 |
| 17 | 2255 | 1234 | 0.2 | 21.0 | 0.0 |

* Average reading of two probes located at opposite sides of the kiln at each probe position.
N.R. — No reading taken.

TABLE II

TUNNEL KILN ATMOSPHERE STUDY FOR GROUP II BRICKS

| PROBE POSITION | T °F. | T °C. | % CO$_2$ | % O$_2$ | % CO |
|---|---|---|---|---|---|
| 1 | 1810 | 988 | 8.6 | 4.2 | N.M. |
| 2 | 2000 | 1093 | 9.0 | 3.8 | N.M. |
| 3 | 2520 | 1382 | 10.4 | 1.1 | 0.2 |
| 4 | 2700 | 1480 | 4.5 | 9.0 | N.M. |
| 5 | 2960 | 1627 | 9.9 | 0.01 | 0.4 |
| 6 | 3143 | 1730 | 10.1 | 0.0 | 0.0 |
| 7 | 3192 | 1756 | 10.2 | 0.0 | 0.0 |
| 8 | 3220 | 1770 | 10.4 | 0.8 | 0.4 |
| 9 | 3215 | 1768 | 10.3 | 0.9 | 0.0 |
| 10 | 3208 | 1764 | 9.0 | 3.2 | N.M. |
| 11 | 3160 | 1738 | 5.8 | 5.0 | 0.0 |
| 12 | 2980 | 1638 | 3.7 | 11.6 | N.M. |

N.M. — Not Measured

A non-oxidizing atmosphere was maintained around the Group I brick as the brick was heated to 2940°F. (1616°C.) The Group II brick was fired in a similar manner, but was subjected to an oxidizing atmosphere as the brick passed through a zone in the tunnel kiln held at about 2700°F. (1480°C.) This local oxidizing atmosphere probably resulted from an air intake leak somewhere in the zone. The properties of the two groups of brick after firing are set forth in Table III below.

TABLE III

| | | Group I | Group II |
|---|---|---|---|
| Bulk Density | (g/cc) | 3.08 | 3.06 |
| Porosity | (%) | 15.8 | 16.3 |
| Hot Modulus of Rupture (p.s.i.) | | | |
| at 2700°F. | | 1100 | 470 |
| at 2900°F. | | 235 | 115 |
| Creep at 25 p.s.i. | (%) | 1.77 | 4.86 |

The results of this Example show that the maintenance of non-oxidizing conditions during the heating step produces brick having superior physical properties, and having a particularly high hot modulus of rupture. The results show that it is especially important to maintain the non-oxidizing atmosphere as the temperature of the brick approaches 1500°C. (2732°F.) The Group I brick, which was heated in a non-oxidizing atmosphere during firing to this temperature range exhibits superior properties to the Group II brick which was exposed to oxidation just prior to achieving a temperature of 1500°C. (2732°F.).

What is claimed is:

1. A process for the preparation of direct bonded refractory shapes, which comprises firing at a temperature of at least 1650°C. a pressed refractory composition consisting essentially of magnesite and chrome ore in a combination suitable for forming a direct bonded refractory shape, wherein the improvement comprises, the heating stage of said firing to be conducted in a non-oxidizing atmosphere having a fuel to air ratio of at least 1:1 and which does not comprise more than about 0.5 percent oxygen by volume as measured by Orsat analysis, so that during the heating stage while heating the refractory shape above 800°C. essentially all of the iron oxide in the chrome ore is maintained in its divalent state.

2. A process according to claim 1 wherein the non-oxidizing atmosphere is maintained during the heating stage while heating the refractory shape above 1300°C.

3. A process according to claim 1 wherein the maturing temperature is a temperature in the range of about 1700° to 1900°C.

4. A process according to claim 1 wherein the refractory composition comprises by weight in the range of about 40 to 80 percent magnesite and about 20 to 60 percent chrome ore.

5. A process according to claim 4 wherein the refractory composition comprises by weight in the range of about 50 to 70 percent magnesite and 30 to 50 percent chrome ore.

6. A process according to claim 4 wherein the silica in the refractory composition constitutes less than 5 percent by weight of the composition.

7. A process according to claim 6 wherein the silica constitutes less than 2 percent by weight of the composition.

8. A process according to claim 1 wherein the atmosphere during the heating stage does not comprise more than about 0.5 percent oxygen by volume and the fuel to air ratio is greater than 1:1.

9. A process according to claim 8 wherein the refractory composition comprises by weight in the range of about 40 to 80 percent magnesite and 20 to 60 percent chrome ore.

10. A process according to claim 9 wherein the refractory composition comprises by weight in the range of about 50 to 70 percent magnesite and 30 to 50 percent chrome ore.

11. A process according to claim 10 wherein silica constitutes less than 2 percent by weight of the composition.

* * * * *